(12) United States Patent
Sugino et al.

(10) Patent No.: US 8,445,857 B2
(45) Date of Patent: May 21, 2013

(54) FLAME SENSOR

(75) Inventors: Yoshihide Sugino, Tokyo (JP); Keisuke Sumiyoshi, Tokyo (JP); Nanako Yanada, Tokyo (JP); Yuuichi Nakajima, Tokyo (JP)

(73) Assignee: Azbil Corporation, Tokyo (JP)

( * ) Notice: Subject to any disclaimer, the term of this patent is extended or adjusted under 35 U.S.C. 154(b) by 0 days.

(21) Appl. No.: 13/045,678

(22) Filed: Mar. 11, 2011

(65) Prior Publication Data
US 2011/0240871 A1    Oct. 6, 2011

(30) Foreign Application Priority Data
Mar. 31, 2010    (JP) .................. 2010-081128

(51) Int. Cl.
*G01J 1/42*     (2006.01)
*G03C 1/005*    (2006.01)
*G03C 1/494*    (2006.01)
*H01J 27/00*    (2006.01)

(52) U.S. Cl.
USPC .............. 250/372; 430/577; 430/579; 313/53

(58) Field of Classification Search
USPC ................. 250/372; 430/577, 579; 313/53
See application file for complete search history.

(56) References Cited

U.S. PATENT DOCUMENTS

| | | | |
|---|---|---|---|
| 3,793,552 A * | 2/1974 | Glascock et al. ........... 313/539 |
| 6,104,297 A | 8/2000 | Danilychev | |
| 6,208,252 B1 * | 3/2001 | Danilychev ................. 340/577 |
| 7,123,154 B1 * | 10/2006 | Smith ........................ 340/600 |
| 7,541,938 B1 * | 6/2009 | Engelhaupt .................. 340/578 |
| 2005/0174244 A1 * | 8/2005 | Grow ........................... 340/577 |
| 2007/0131869 A1 | 6/2007 | Cole | |

FOREIGN PATENT DOCUMENTS

JP    7-113685 A    5/1995

* cited by examiner

*Primary Examiner* — Christine Sung
(74) *Attorney, Agent, or Firm* — Troutman Sanders LLP

(57) ABSTRACT

A flame sensor is provided with a focusing member. Ultraviolet light emitted from a light source is reflected by an inner surface of the focusing member to be focused on an electrode of an electrode pair, to increase the sensitivity.

1 Claim, 3 Drawing Sheets

FLAME SENSOR

CROSS REFERENCE RO RELATED APPLICATIONS

The present application claims priority under 35 U.S.C, §119 to Japanese Patent Application No. 2010-081128, filed Mar. 31, 2010, which is incorporated herein by reference.

FIELD OF TECHNOLOGY

The present invention relates to a. flame sensor for detecting whether or not there is a flame in a combustion device such as, for example, a large boiler or a heating furnace, or the like.

BACKGROUND OF THE INVENTION

Conventionally, flame sensors have been used in combustion devices such as boilers to detect whether or not a flame has been produced properly with in the furnace. The flame sensor detects whether or not there is a flame by detecting ultraviolet light that is outputted from the flame at the time of combustion.

In this type of flame sensor it is necessary to increase the luminous flux or the concentration of the incident ultraviolet light, in order to increase the sensitivity. While simply increasing the diameter of the flame sensor would increase the incident ultraviolet light, if such a large flame sensor were installed in the combustion equipment, it would cause too large a change in the shape of the furnace or in the capacity thereof, which could have a deleterious effect on the combustion reaction, or the like. Given this, conventionally a lens 102 that is transparent to infrared light has been disposed between the light source (the flame) and the flame sensor 101, as illustrated in FIG. 5, to focus the ultraviolet light that is incident on the lens 102, to thereby achieve an increase in the luminous flux or the concentration of the incident ultraviolet light onto the flame sensor 101 (See, for example, Japanese Unexamined Patent Application Publication 1107-113685).

However, because the material for tenses that are transparent to ultraviolet light (quartz glass, or the like) is expensive, mass production and cost reduction has been difficult.

Given this, the object of the present invention is to provide a flame sensor that can be manufactured at a relatively tow cost and that can increase sensitivity easily.

SUMMARY OF THE INVENTION

In order to solve the problem such as set forth above, the flame sensor according to the present invention includes an electrical discharge tube wherein a pair of electrical discharge electrodes for producing and electrical discharge by incidence of ultraviolet light is sealed within the tube; and a focusing member having a reflecting surface that is open towards the electrical discharge tube side on one end and towards the light source side on the other end, having at least a portion that is disposed further towards the light source side than an electrical discharge electrode, for reflecting, by the reflecting surface, the ultraviolet light that arrives from the light source to focus onto the electrical discharge electrode.

In the flame sensor set forth above, the focusing member may have a reflecting surface that is open on one end towards the electrical discharge tube side and on the other end towards the light source side, made from either a parabolic surface or a conical surface wherein the opening is wider towards the light source.

Given the present invention, the provision of the focusing member focuses, on the electrical discharge electrode, the ultraviolet tight that arrived at the focusing member, thereby increasing the sensitivity easily.

DETAILED DESCRIPTION OF THE INVENTION

An example according to the present invention will be explained in detail below reference to the drawings.

Figure 1:
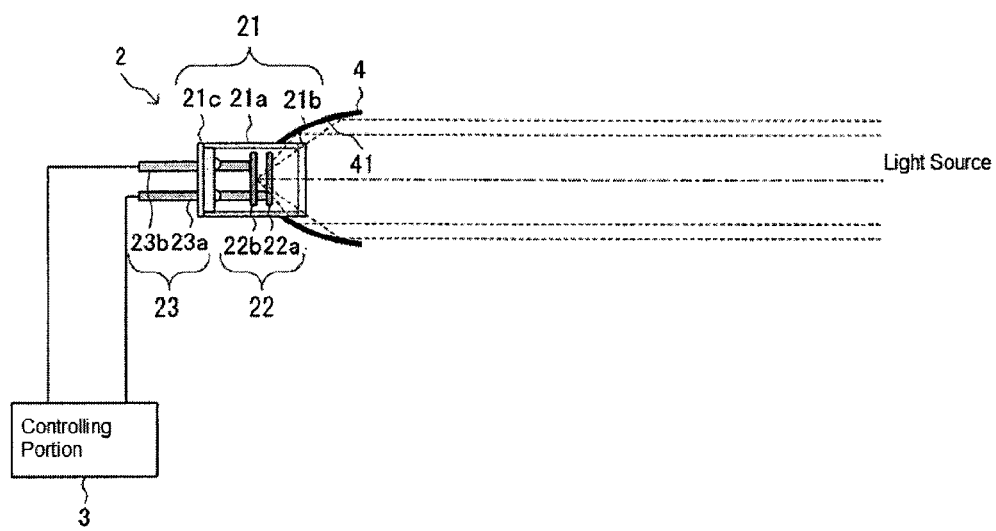
FIG. 1 is a diagram illustrating schematically the structure of a flame sensor according to the present invention.

As illustrated in FIG. 1, the flame sensor 1 includes an electrical discharge tube 2 made from a cylindrical tube; a controlling portion 3 connected to the electrical discharge tube 2; and a focusing member 4 having at least a portion thereof provided further towards the light source side than the electrical discharge tube 2.

The electrical discharge tube 2 is structured from an envelope 21 having a shape that is cylindrical in general, an electrode pair 22 that is disposed within the envelope 21, and leads 23 that lead out to the outside of the envelope 21, connected on one end to the electrode pair 22.

The envelope 21 is structured from a tube portion 21*a* that is made from a tube that is open on both ends, a plug portion 21*b* that is made from an ultraviolet light-transparent glass (quartz glass) that blocks one of the openings of the tube 21*a*, and abase portion 21*c* that blocks the other opening of the tube portion 21*a*, The inside of this envelope 21 is sealed. The electrode pair 22 is structured from an electrode 22*a* that is formed from a disk that is disposed facing the plug portion 21*b*, and an electrode 22*b*, made from a disk that is disposed facing the electrode 22*a* on the base portion 21*c* side. Here the electrode 22*a* and the electrode 22*b* are disposed in parallel with each other, separated by a specific gap. This type of electrode pair 22 produces an electrical discharge through the incidence of ultraviolet light. Note that the electrode 22*a* preferably is disposed within the envelope 21 with the center thereof positioned on the centerline of the envelope 21.

The leads 23 include first lead 23*a*, connected on one end to the electrode 22*a*, and a second lead 23*b*, connected on one end to the electrode 22*b*. The other ends of the first lead 23*a* and the second lead 23*b* are connected ultimately to the controlling portion 3.

The controlling portion 3 is structured from an electrical circuit that not only controls the operation of the electrical discharge tube 2, but also detects a. flame through the electrical discharge that is produced by the electrode pair 22.

The focusing member 4 is open on one end to the electrical discharge tube 2 side and open, on the other end, to the light source side, and is structured from a member provided with an inner surface 41 made from a. curved surface or a conical surface having an opening that is wider towards the light source side. Here the inner surface 41 is disposed so that at least a portion thereof is positioned further towards the light source side than the electrode 22*a*, and is formed so as to be more distant from the line that is normal to the plane of the electrode 22a, through the center of the electrode 22a, the nearer to the light source. Additionally, the slope of the inner surface 21 is formed so as to reflect the tight that is emitted from the light source towards the center of the electrode 22a when the light source is positioned on the normal line. Furthermore, the inner surface 41 preferably is in the form of a mirrored surface that easily reflects the ultraviolet light. In this type of focusing member 4, if at least the inner surface 41 is formed from a material that reflects ultraviolet light, such as a metal such as aluminum or chronic, it can be manufactured through a variety of methods such as plating or vapor deposition of metal on a plastic molded member, a process for extruding or cutting metal, or the like.

Note that FIG. 1 illustrates, as one example, a case wherein, in the focusing member 4, the inner surface 41 has a parabolic surface shape, with a. shape that is, overall, a circular truncated cone, where the opening on the envelope the one side of the focusing member 4 is attached to the envelope 21 through fitting onto the outer peripheral surface of the envelope 21; however, there is no limitation to the shape of the focusing member 4 or to the method of attaching to the envelope 21 insofar as at least a portion of the inner surface 41 is positioned further towards the light source side than the electrode 22a, and these can be established freely as appropriate.

In this type of flame sensor 1, the ultraviolet light that is emitted from the light source towards the flame sensor 1 along the vicinity of the axis of the electrical discharge tube 2 passes directly through the plug portion 21b to arrive at the electrode 22a. On the other hand, the ultraviolet light that is emitted from the light source towards the flame sensor 1 at some slight distance from the axis of the electrical discharge tube 2 arrives at the focusing member 4. The inner surface 41 of the focusing member 4 is formed so as to reflect, towards the center of the electrode 22a, the light that is incident, as described above. Consequently, the infrared light that arrives at the focusing member 4 is reflected by the inner surface 41, to be focused on the center of the electrode 22a. When the ultraviolet light arrives at the electrode 22a, an electrical discharge is produced by the electrode pair 22, and is inputted into the controlling portion 3 through the leads 23. When electrical power is inputted based on the electrical discharge, the controlling portion 3 evaluates the state of the flame based on the electrical power.

In the present example, as described above, the provision of the focusing member 4 makes it possible for the light that is emitted towards the flame sensor it from the light source to be focused, by the focusing member 4, onto the electrode 22a, to increase the luminous flux or the concentration of the ultraviolet light that is incident on the electrode 22a, without the use of an ultraviolet-transparent glass, thus making it possible to increase the sensitivity of the flame sensor.

Figure 3:
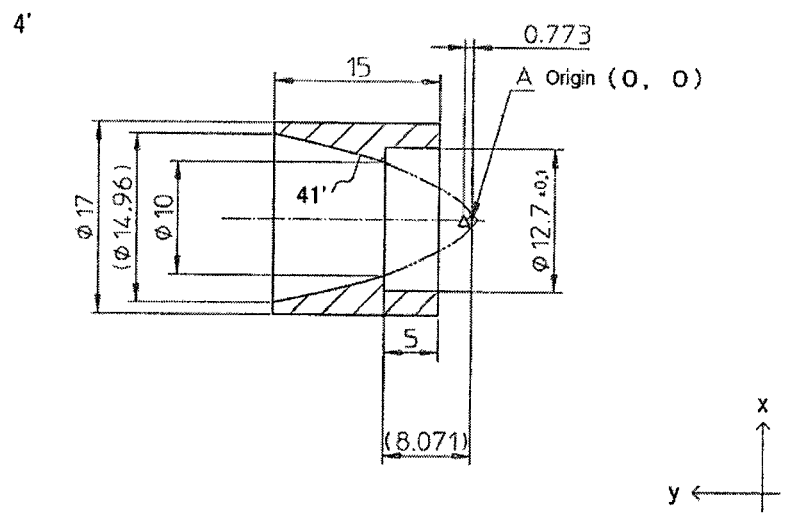
FIG. 3 is a cross-sectional diagram illustrating a parabolic-surface mirror in FIG. 2.
Figure 4:
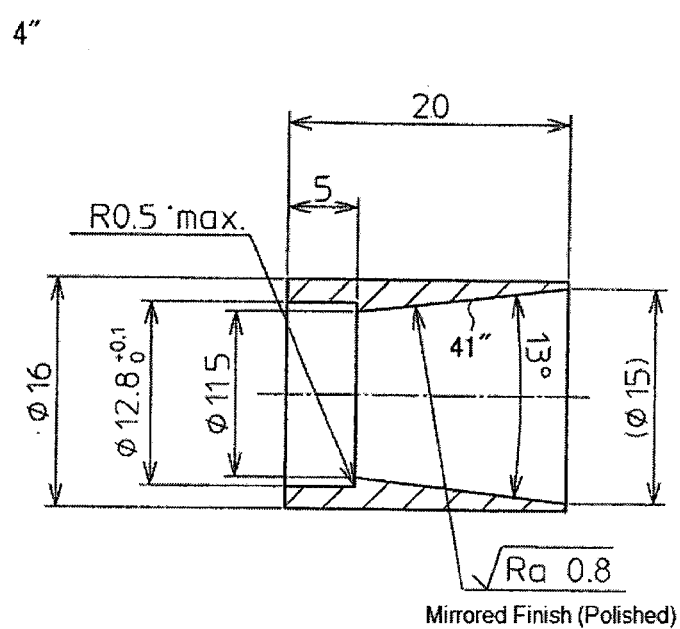
FIG. 4 is a cross-sectional diagram illustrating a tapered-surface minor in FIG. 2.
Figure 5:
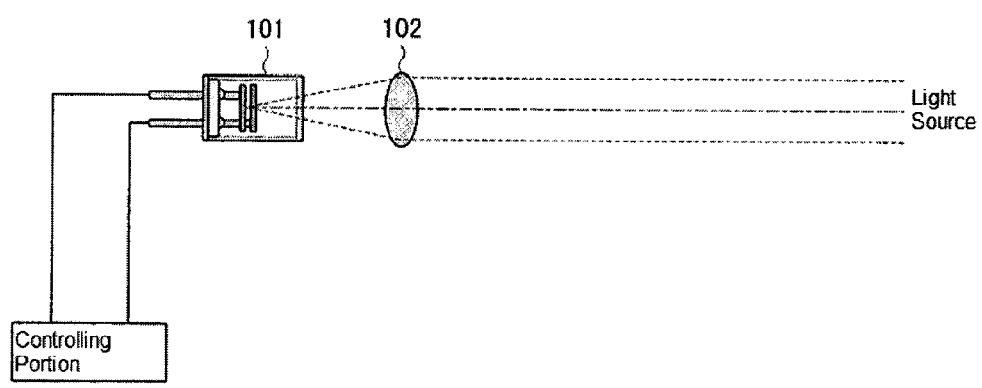
FIG. 5 is a diagram illustrating schematically a structure of a conventional flame sensor.

The measurement results by a flame sensor it provided with this type of focusing member 4 are presented in FIG. 2, Note that the measurement results presented below use a standard alcohol flame as the light source, a multiburner controller FRS 100C100 (100 V AC, 50 Hz), manufactured by Yamatake Co., Ltd., as the controlling portion 3 for controlling the electrical discharge tube 2, and used, as the electrical discharge tube 2, a Mini Ultra Vision (C7035), manufactured by Yamatake Co., Ltd., where the flame voltage was measured using a digital multimeter. These measurements were performed using a focusing member 4' having an inner surface 41' made from the parabolic surface as illustrated in FIG. 3 (indicated as the "Parabolic Mirror Surface" in HG. 2), a focusing member 4" having an inner surface 41" made from a conical surface having the conical surface illustrated in FIG. 4 (indicated as the "Tapered Mirror Surflice" in FIG. 2), and using the focusing member 4 (indicated as the "Normal Product" in FIG. 2). Here the units for the values given in FIG. 3 and FIG. 4 are millimeters.

Figure 2:
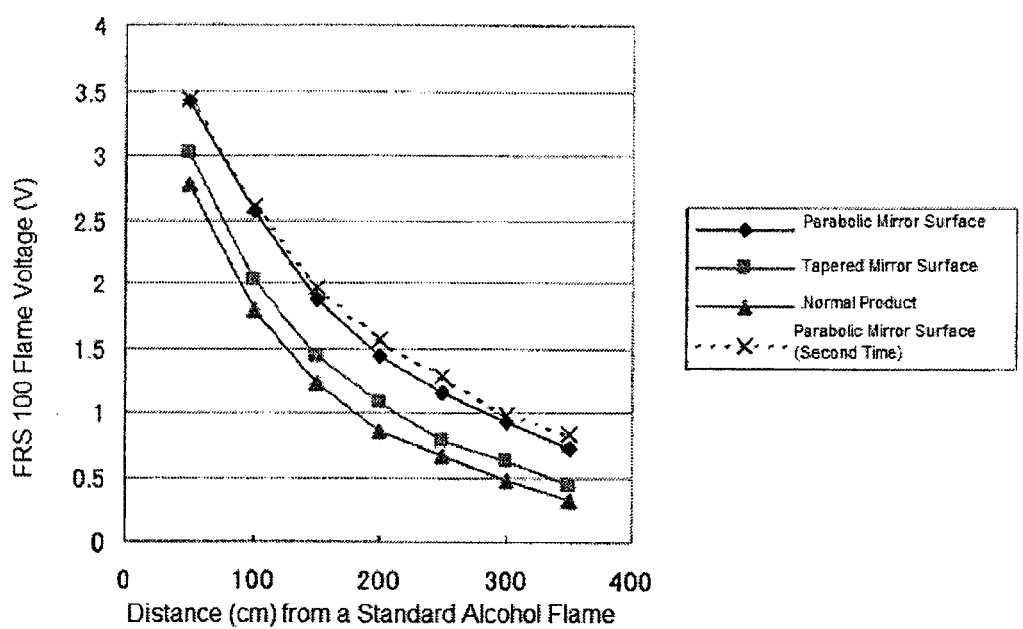
FIG. 2 is a diagram illustrating measurement results of the flame voltages.

Note that the "Parabolic Mirror Surface (Second Time)" is the result of a second measurement performed using the same focusing member 4 as in the "Parabolic Minor Surface" in FIG. 2. Furthermore, in FIG. 3, when Point A is the focal point, the inner surface 41' is formed in a parabolic surface drawn by $y = 0.323 \times^2$, where the focal point is (0, 0.0773).

As illustrated in FIG. 2, the provision of the focusing member 4 made from either a "Parabolic Mirror Surface" or a "Tapered Mirror Surface" makes it possible to increase the value of both of the flame voltages beyond the case wherein the focusing member 4 (the "Normal Product") is used. From this result it can be see that the provision of the focusing member 4 made from the "Parabolic Mirror Surface" or the "Tapered Mirror Surface" can increase the sensitivity of the flame sensor 1.

As explained above, the present form of embodiment focuses, onto the electrode 22a of the electrode pair 22, the ultraviolet light that is emitted from the light source, through the provision of the focusing member 4, thus making it possible to improve the sensitivity of the flame sensor.

Additionally, the focusing member 4 can be structured through plating or vapor deposition of metal onto a plastic molded member, or through a process of extruding or cutting metal, and thus can be manufactured less expensively than the case of focusing the ultraviolet light onto the electrode 22a of the electrode pair 22 using an ultraviolet-transparent lens. This makes it possible to achieve mass production and a reduction in cost.

The present invention can be applied to equipment for detecting ultraviolet light, such as a flame sensor.

The invention claimed is:
1. A flame sensor comprising:
an electrical discharge tube including
  a tube portion having a tube with openings at both ends of the tube,
  a plug portion having an ultraviolet light-transparent glass that blocks one of the openings of the tube,
  a base portion blocking the other opening of the tube, and
  a pair of electrical discharge electrodes being sealed within the electrical discharge tube, which produces electrical discharge by incidence of ultraviolet light from a light source through the plug portion, the electrical discharge electrodes each having a disc-shape; and
a focusing member having reflecting surface for reflecting the ultraviolet light from the light source to focus on the electrical discharge electrodes, wherein
the reflecting surface has either a parabolic shape or a conical shape having a first opening becoming wider towards the light source and a second opening for allowing the ultraviolet light to reach the electrical discharge electrodes which are provided at a focus of the reflecting surface,
the reflecting surface is formed to be more distant from a line towards the light source from the electrical discharge electrodes, the line running through the center of, and being normal to, the respective disc-shaped electrical discharge electrodes, and
the plug portion is provided closer to the second opening than to the first opening of the reflecting surface of the focusing member.

* * * * *